(No Model.)  5 Sheets—Sheet 1.
J. F. McELROY.
SYSTEM OF MOTOR TRUCKS.
No. 578,760. Patented Mar. 16, 1897.
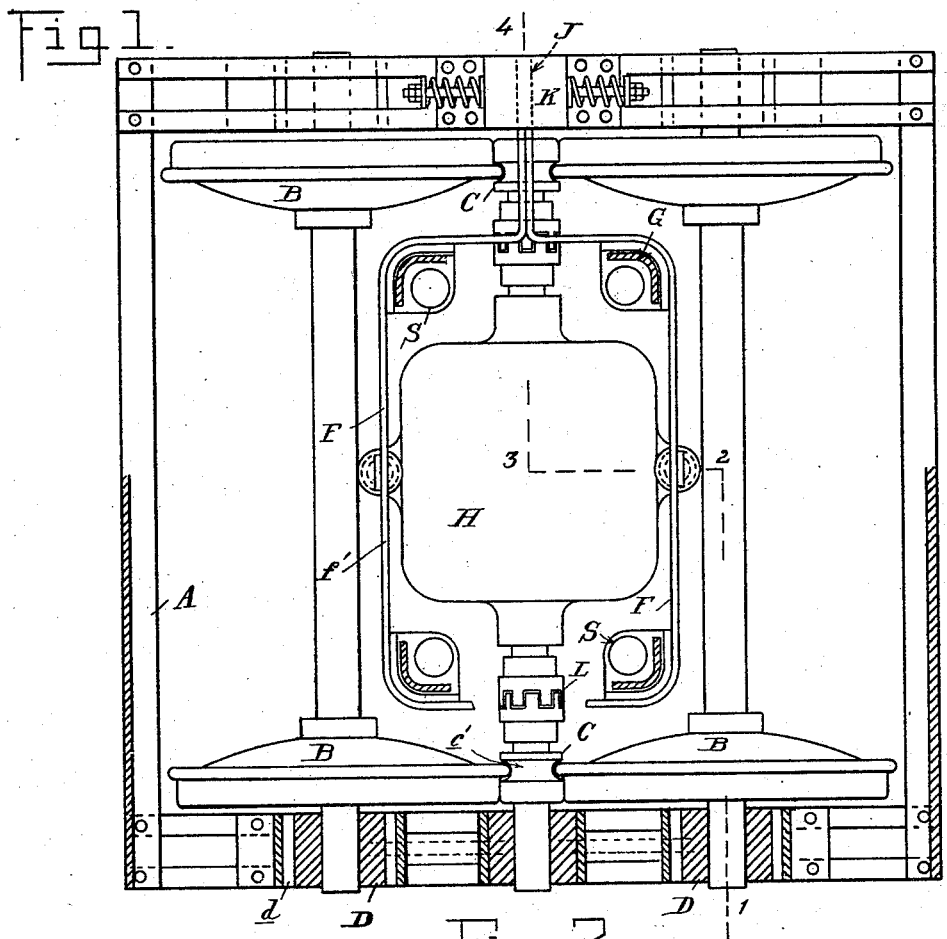
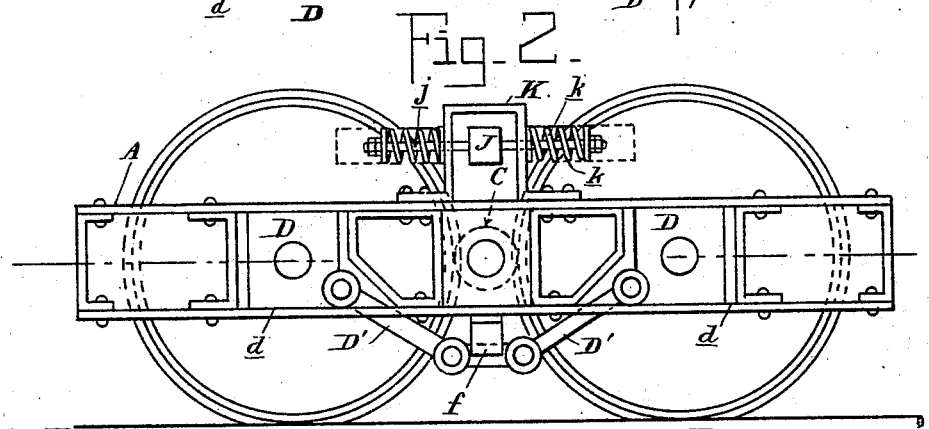
Witnesses:
Grace T. Many.
Chas. B. Mitchell.
Inventor
James F. McElroy
By Ward & Cameron
Atty's

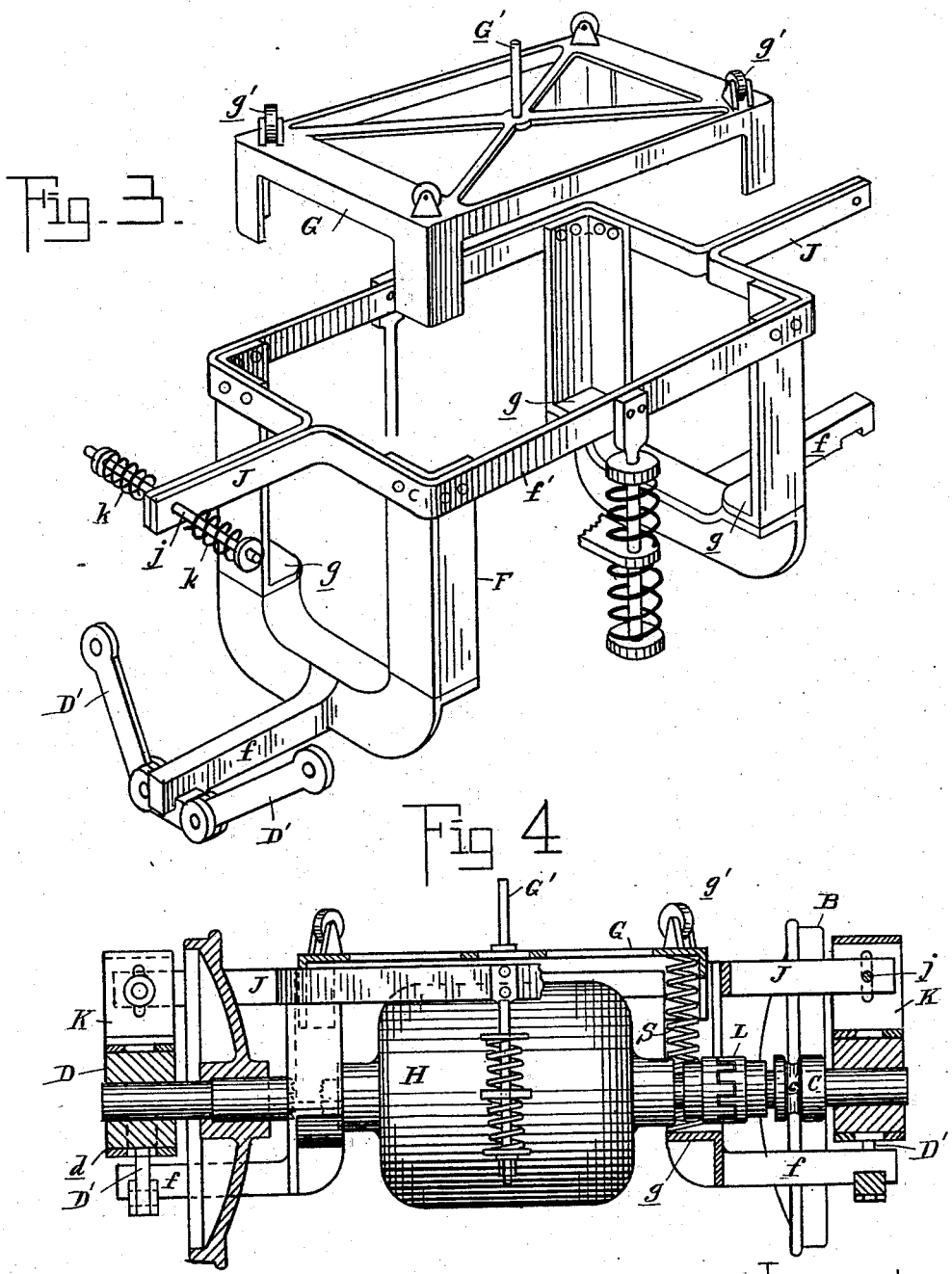

(No Model.) 5 Sheets—Sheet 3.
J. F. McELROY.
SYSTEM OF MOTOR TRUCKS.
No. 578,760. Patented Mar. 16, 1897.
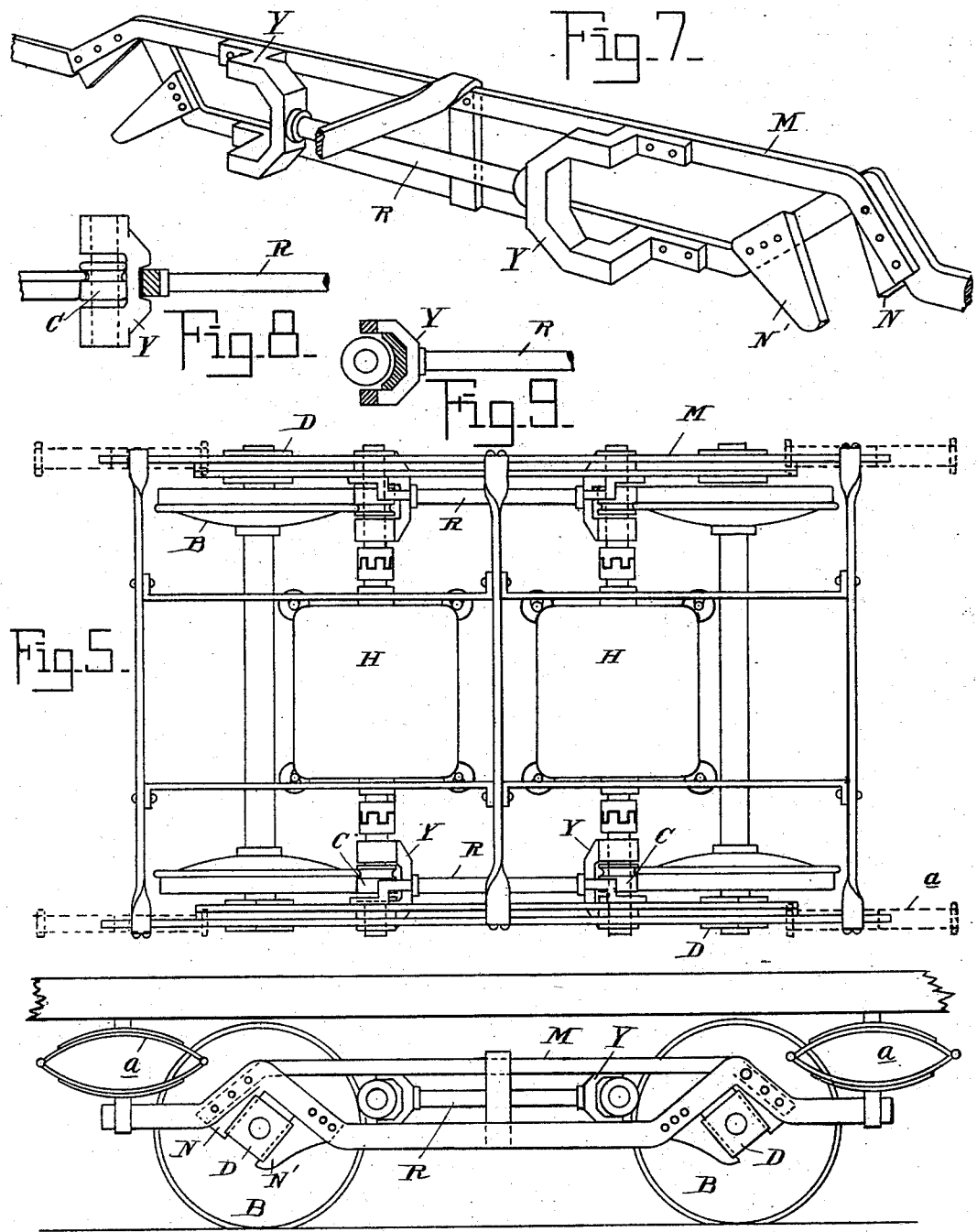

(No Model.)

5 Sheets—Sheet 4.

J. F. McELROY.
SYSTEM OF MOTOR TRUCKS.

No. 578,760. Patented Mar. 16, 1897.

Witnesses:
Grace T. Many.
Chas. B. Mitchell

Inventor.
James F. McElroy
by Ward & Cameron
Atty's.

(No Model.)

J. F. McELROY.
SYSTEM OF MOTOR TRUCKS.

No. 578,760.                    Patented Mar. 16, 1897.

Witnesses:
Grace T. Many.
Chas. B. Mitchell.

Inventor
James F. McElroy
by Ward & Cameron
Atty's

UNITED STATES PATENT OFFICE.

JAMES F. McELROY, OF ALBANY, NEW YORK, ASSIGNOR TO THE CONSOLIDATED CAR-HEATING COMPANY, OF SAME PLACE.

SYSTEM OF MOTOR-TRUCKS.

SPECIFICATION forming part of Letters Patent No. 578,760, dated March 16, 1897.

Application filed July 9, 1896. Serial No. 598,590. (No model.)

*To all whom it may concern:*

Be it known that I, JAMES F. MCELROY, a citizen of the United States, residing in the city and county of Albany, State of New York, have invented a new and useful Improvement in Systems of Motor-Trucks, of which the following is a specification.

My invention relates to improvements in motor-trucks; and the objects of my invention are to provide a street-car truck arranged in such a manner that the noise now attendant upon the operation thereof will be greatly reduced, the "pounding" averted, the movement of the car rendered more smooth, attended with less vibration, and so arranged that the brakes may be operated more quickly, and the construction such that the truck may be made at less expense and capable of greater endurance than those now in use. I attain these objects by means of the mechanism illustrated in the accompanying drawings, in which—

Figures 10, 11:
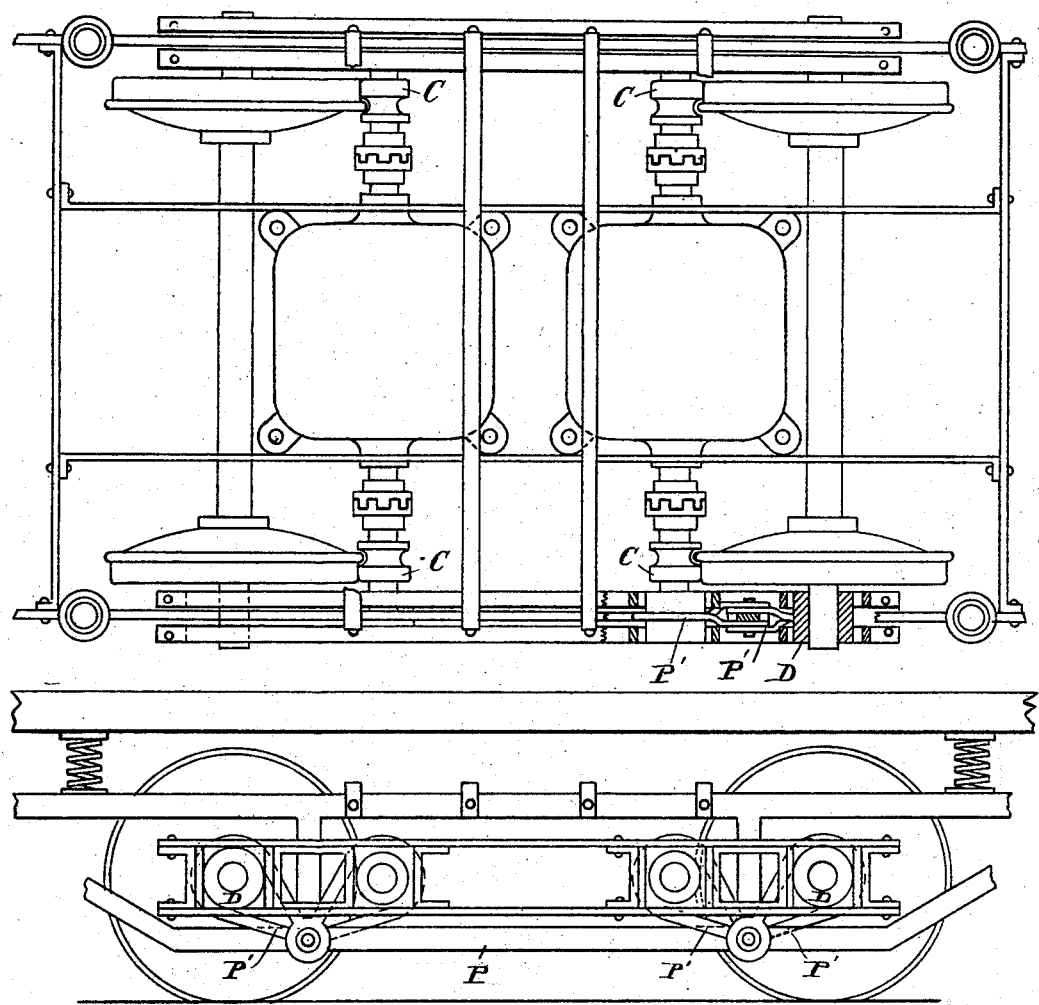
Figure 14:
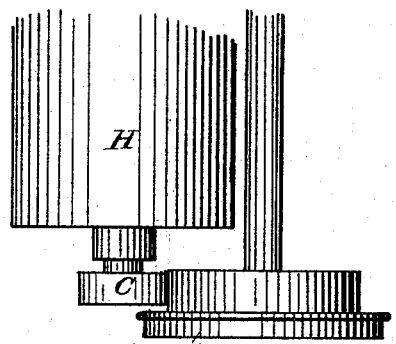
Figure 12:
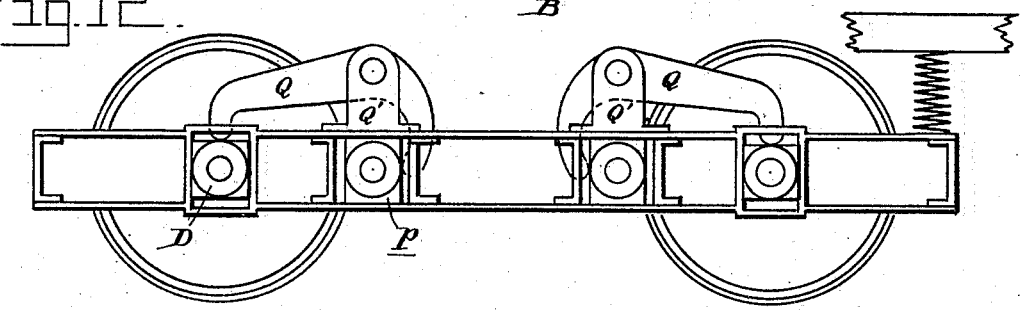
Figure 13:
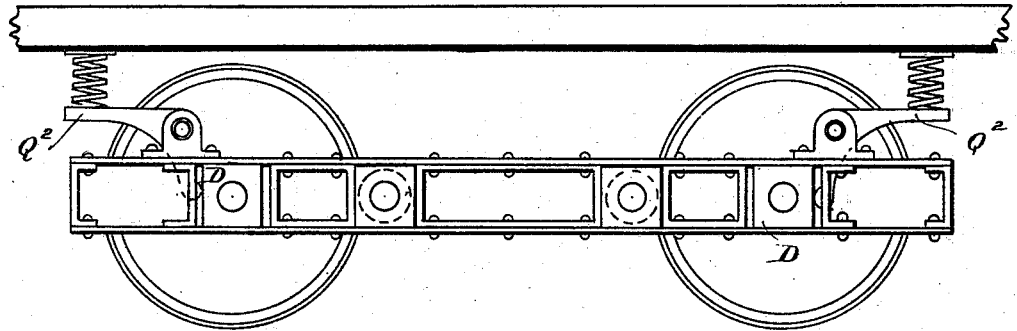

Figure 1 is a plan, partly in section. Fig. 2 is a side elevation. Fig. 3 is a detail perspective view of the saddle F. Fig. 4 is a section along the lines 1 2 3 4 on Fig. 1. Fig. 5 is a plan of a modified form of truck. Fig. 6 is a side elevation of Fig. 5. Fig. 7 is a detail perspective view of the journal-supports. Fig. 8 is a plan, partly in section, showing the connection between the rod R and the yoke Y. Fig. 9 is a detail view of the yoke Y. Fig. 10 is a plan of a modified form of my invention. Fig. 11 is a side elevation of Fig. 10. Fig. 12 is a side elevation of a modified form of my invention, and Fig. 13 is a side elevation of a modified form of my invention. Fig. 14 shows the friction-roller in contact with a ring mounted on the shaft.

Similar letters refer to similar parts throughout the several views.

In electric cars the trucks provided with electric motors are now arranged in such a manner that the armature communicates with the car-axle by means of a pinion on the motor-shaft, which intermeshes with the spur-wheel on the car-axle. The spur gear-wheel is necessarily of smaller diameter than the drive-wheel, for the reason that the spur-wheel must not reach to within five or six inches of the ground. These spur gear-wheels are expensive and quickly wear out, and when the teeth on the pinion or the gear-wheel break the motor becomes inoperative and it is absolutely unable to propel the car. When the pinions become slightly worn, the smooth running of the wheels is interfered with, causing a step-by-step motion instead of a steady rotary motion, the steps being taken by successive contacts of tooth and tooth. When wheels in this condition are caused to turn rapidly or are transmitting a large amount of energy, the successive contacts of the teeth of the two sets of wheels produce a noise which is exceedingly unpleasant. Because of this objection the pinions and gear-wheels are often obliged to be thrown away long before the teeth are worn to such an extent as to become absolutely inoperative.

In the construction of large cars practical railroad men have encountered difficulties because of the desire to employ two independent trucks, it being almost impossible to obtain tractive effect sufficient to operate heavy cars unless all of the wheels carrying the weight of the car are also employed in driving the car. Thus, if a car has two trucks, each made of two pairs of wheels, it has been deemed necessary, especially where heavy grades are to be encountered, to place four motors upon the car, one connecting to each pair of wheels. The cars must be so constructed that they will turn ordinary street corners, and therefore the wheel-base must be brought within such limits that the pair of wheels which tend to move upon the tangent of the curve will slip sufficiently to follow the curve itself. On this account when a single truck is used the distance between the center of the wheels which constitutes the wheel-base is limited to about seven feet. This short wheel-base is used in cars having a length as great as twenty-five feet or more. The result of the short wheel-base is that whatever motion is produced by irregularities in the track is enlarged in proportion to the length of the car to the wheel-base, so that ordinarily the up-and-down motion at the end of a car twenty-five feet long is at least four times the amount of the motion at the wheel-base. It is for the purpose of overcoming these difficulties with the existing method that I have invented a traction system which makes practical the use of double trucks with longer cars, and where short cars are desired does away with pinions and gear-wheels, and therefore the noise produced by those devices and the expense incurred in short maintenance. To accomplish this, I construct a truck A, in which the two sets of wheels B B belonging in the truck are brought closer together, giving a short wheel-base in the truck, so that it will turn corners more easily, and then placing between the forward and rear sets of wheels a friction-roller C, preferably made of steel, and so arranging the truck as to cause a pressure between the friction-roller C and the faces of the car-wheels B B. This pressure may be approximately equal to the pressure of the wheel upon the track. I then connect an electric or other motor so as to cause the rotation in the friction-roller C, and the friction between the roller and the two sets of car-wheels will cause, when the motor is operated, the rotation of all the wheels of the truck in the same direction. I preferably place a roller C between the wheels on both sides of the car, so that all of the four wheels of the truck are driven by the same motor and all driven in the same direction.

It is obvious that I may use but one friction-roller in the truck, the same being rotated from the armature-shaft and then communicated to the forward and rear wheels of that truck and by means of the axles of each pair of wheels communicate the motion to the wheels running on the opposite side of the car.

In constructing the truck so as to cause the two sets of drive-wheels to bear against the friction-roller a number of constructions may be followed, all of which have the same object in view, namely, the increase of tractive effect between the friction-roller and the drive-wheels by means of pressure. I preferably employ for this purpose the weight of the car to produce the thrust, so that as the load of the car increases, and hence the amount of power necessary to move the car upgrade increases, I also increase the tractive effect between the friction-roller and the drive-wheels. I therefore construct a truck-frame A, which rests upon the bearings of the drive-wheels B B and enlarge the truck-frame bearings $d$ $d$ of one or both of the drive-wheels, so that they may have a horizontal motion toward the friction-roller, as shown in Fig. 2, the bearings $d$ $d$ being capable of motion within the truck-frame. I then connect the journal-boxes D D by means of suitable links D' D' to the arm $f$ on the saddle F, the saddle F carrying the weight of the motor, the weight of the car, or both the weight of the motor and the weight of the car. It is evident that the downward pressure upon this saddle, which is suspended from the bearings from the truck-journals, draws those journals toward each other, and by adopting the proper angles between the connections to the saddle and the journal-boxes the pressure which may be brought to bear upon the friction-roller may be increased to any desired extent. I preferably construct this saddle F in the form shown in Fig. 3, being provided with spring-seats $g$ $g$ in each corner of the frame composing the saddle, upon which seats $g$ $g$ is arranged a spiral spring S, which forms a cushion for the supporting-frame G, which is constructed to fit within the saddle F, and which frame G is provided on its upper surface with suitable wheels or rollers $g'$ for the purpose of allowing for the free rotating movement of the car-body upon the frame G.

Secured to the frame G and projecting therefrom I arrange a king-bolt $G'$, which projects into the car-body. Beneath the frame G and within the saddle F, I mount the motor H, supporting the same with strong springs sufficient to carry the weight of the motor, making elastic connections from the sides $f'$ of the saddle or in any suitable manner. I arrange a guide-arm J to each end of the saddle F, which arms project into a bearing in the bracket K, secured to the frame A, and has a rod $j$ passing through the guide-arm J, also through the bracket K, said rod $j$ carrying on each side of the bracket K a spring $k$ $k$, allowing for a slight horizontal motion against the tension of the spring $k$, the bearing in said bracket also allowing for a slight vertical movement of the saddle.

For the purpose of allowing for an up-and-down movement of the motor I usually arrange a flexible connection between the friction-roller shaft $c$ and the armature, as at L. As thus arranged the supporting-frame G, which rests in the saddle F, is capable of a slight vertical motion within the bracket K, and thus allows for any wear that may take place in the friction-roller or in the car-wheels themselves, so that in all circumstances the weight of the car may be made to operate to cause the desired pressure of the drive-wheels upon the friction-rollers.

It is well-known that the drive-wheels do not wear evenly, and the wear of the drive-wheels by running on the roller comes more largely upon those parts of the drive-wheels which bear against the track, and the wear therefore comes upon that portion near the flange of the drive-wheels.

It will be noticed that the friction-roller is so placed in my truck that its bearing upon the face of the drive-wheels is greater against those portions of the drive-wheel which do not receive the wear of the track. Thus I make the drive-wheels wear evenly, as that part which is now worn by contact with the rails does not receive the wear due to contact with the friction-roller, but rather those portions either outside or inside the plane of rail-contact. In the construction of the friction-roller C, I preferably make a groove in the friction-roller, as at $c'$, in which the flanges of the two drive-wheels bear in running. I preferably make this construction such that the bearing against the flange will come in the line of the face of the drive-wheel itself. This construction makes it possible to operate this device without any slipping whatever in any part of the friction-roller in contact with the drive-wheels. It also serves another important purpose. Since the flanges of the forward and rear wheels both run in the same groove in the friction-roller, I employ this groove to lock the forward and rear sets of drive-wheels together in such a way that when the forward wheels strike a curve, causing a pressure parallel to its axis, the strain is not thrown upon the truck-frame, but is communicated through the interlocking of the flanges of the forward and rear drive-wheels to cause a reshifting of the truck as a whole to meet the new direction of motion of the truck. This interlocking arrangement prevents the strain of side motion in one set of drive-wheels being thrown upon the truck-frame, which in the ordinary construction of apparatus must be strong enough to draw upon the rear set of drivers, producing slipping on one of the wheels of this set sufficient to shift the truck to its new position.

I am also enabled by the use of this apparatus to apply the brake to the wheels of the truck, causing them to stop rotation quickly. This causes a slipping between the friction-roller and the faces of the wheels which would result in the stripping of the cogs were pinions and gear-wheels employed. In the same way the use of my apparatus prevents shocks coming from the sudden application of current to an electric motor, which are taken up between the friction-roller and the drive-wheels in part at least, which in the case of pinions and gear-wheels would strip those wheels of their cogs.

Instead of having the friction-roller brought in contact with the surface of the drive-wheels it is apparent that rings might be constructed upon the drive-wheels, or friction-wheels may be constructed, mounted upon the drive-wheel shafts, against which the friction-roller may bear and which may be caused to operate as herein described. (See Fig. 14.) I may also employ a different construction in which the journal-bearings of the drive-wheels are supported in the truck-frame in such a way that the wheels are brought close together, the distance between them being less than the diameter of the friction-roller. The friction-roller can then be placed either above the wheels or below and caused to wedge into the space between the two wheels, and in this way the pressure between the friction-roller and the drive-wheels may be obtained, causing, when the friction-roller is rotated, the proper direction of rotation in the drive-wheels. In applying this method of traction to cars employing only a single truck it is evidently necessary to place the wheels farther apart in order to obtain proper wheel-base. In making this application of the friction-roller I preferably construct a truck-frame bearing upon the journal-boxes of the driving-wheel axles, as shown in Fig. 6. In building trucks of this kind I preferably use two motors H H, one for each pair of drivers, the friction-roller being connected directly to the motor-shaft, as already described, the motor being suspended, preferably on elastic suspension-springs, to the car-body.

In the construction shown in Figs. 5 and 6 I connect, by means of the rod R, the yokes Y Y, which yokes contain a bearing for the friction-roller C, said rod holding the friction-roller in a fixed position. I preferably make a bearing between the rod R and the yoke Y, such that an up-and-down motion may take place between the rod and the yoke. I construct a frame M upon each side of the truck, upon which is supported the body A of the car, preferably interposing between the two springs $a$ $a$. To the frame M, I secure the yoke Y and arrange the journal-boxes D D of the wheels B B between the downward and upwardly projecting arms N N', so arranged that said journal-boxes D are capable of movement between the arms N N', which arms are placed at a diagonal to the vertical through the drive-wheels, the weight of the car tending to force the journal-boxes D toward the center line of the car and thus draw the wheels toward each other. It is apparent that the greater the weight on the car the greater will be the pressure of the drive-wheels upon the friction-rollers.

In Figs. 10 and 11 I show a modified construction of my truck. In this the weight of the car on the frame A forces downward the tie-plate P, to which the connecting-links P' are attached, the journal-boxes D D of the drive-wheels being capable of horizontal movement, the friction-roller being also capable of horizontal movement. It is apparent that the links P', connecting the journal-boxes of both the friction-roller and the drive-wheels, will, because of the weight of the car resting upon the tie-plate to which the links are secured, cause the contact between the drive-wheels and the friction-roller to be maintained by the weight of the car.

In Fig. 12 I show a modified form of my invention, arranging the bell-crank lever Q, mounted upon the lug Q', which is secured to the frame A, carrying the weight of the car. One end of the bell-crank lever Q rests in contact with the top of the journal-box D of the drive-wheel, the other end in contact with the journal-box $p$ of the friction-roller. Thus, when the weight in the car is increased, the upward pressure on one arm of the bell-crank lever Q will tend to force the friction-roller against the drive-wheel.

The reverse of Fig. 12 is shown in Fig. 13. In this case the friction-rollers are fixed rigidly in position. The weight of the car is on one arm of the lever Q. The tendency is to move the journal-boxes D of the drive-wheels toward the friction-roller.

The contact between the drive-wheels and the friction-roller is an elastic one, because of the movable bearing of the drive-wheels, or when the drive-wheel bearing is immovable, as in the modification shown in Fig. 12, of the movable bearing of the friction-roller.

The friction-roller does not sustain the weight of the car or of the truck, but is left free to adjust itself between the drive-wheels, or in connection with one of the drive-wheels, as the case may be.

I claim—

1. In a truck, forward and rear sets of drive-wheels, a friction-roller placed between them and arranged to rotate in contact therewith, constant contact maintained by the weight of the car acting on the movable bearing of the friction-roller, a motor connected with and adapted to operate said friction-roller, for the purpose set forth.

2. In a truck, forward and rear sets of drive-wheels, a friction-roller, a motor connected with and adapted to operate said friction-roller, said friction-roller and drive-wheels so arranged in relation to each other that the roller shall be in contact with one of the forward and one of the rear wheels of each set in such manner that the rotation of the friction-roller will put in revolution both sets of wheels in the same direction, constant contact between the friction-roller and the drive-wheels maintained by the weight of the car acting on the movable bearing of the drive-wheels, for the purpose set forth.

3. In a truck, forward and rear sets of drive-wheels journal-boxes for said wheels movable horizontally, a roller arranged to make frictional contact with one of the forward and one of the rear wheels of each set, a motor, said roller connected therewith, a car mounted on supports connected with said movable journal-boxes the weight of the car causing the drive-wheels to press against the roller, for the purpose set forth.

4. In a truck, a friction-roller, a motor adapted to impart rotary motion to said roller, forward and rear sets of drive-wheels engaging with said roller, the bearings of said drive-wheels movable horizontally, a frame adapted to carry the car, a saddle supporting said frame, said saddle mounted in said truck, connections between the journal-boxes of the drive-wheels and the saddle, the weight of the car on the saddle, forcing the drive-wheels in contact with the friction-roller, for the purpose set forth.

5. In a truck, the combination of a drive-wheel, a friction-roller, a movable journal-box for said drive-wheel, a car mounted on said truck, means for connecting the supports of said car with the movable journal-box, the weight of the car causing the journal-box of the drive-wheel to so move as to increase the pressure of the drive-wheel upon the friction-roller, for the purpose set forth.

6. In a truck, a friction-roller, a motor adapted to impart rotary motion thereto, a drive-wheel in contact with said friction-roller, a movable bearing for said drive-wheel, and means for increasing the pressure of said drive-wheel against said friction-roller by the weight of the car acting on the journal-box of said drive-wheel, for the purpose set forth.

7. In a truck, a drive-wheel, a roller in frictional contact therewith, a car supported upon a frame, connections between said frame and the journal-box of the drive-wheel and the friction-roller, the weight of the car on the frame operating to draw the drive-wheel and the friction-roller together, for the purpose set forth.

8. In a truck, a motor, a drive-wheel, a friction-roller, said motor adapted to impart a rotary motion to said friction-roller, a movable bearing for said friction-roller in the truck-frame, a car mounted on said truck-frame, a lever connecting the movable journal-box of said friction-roller to said motor, the weight of the car tending to force the friction-roller against the drive-wheel, substantially as described.

JAMES F. McELROY.

Witnesses:
FREDERICK W. CAMERON,
CHAS. B. MITCHELL.